United States Patent [19]

Furuta et al.

[11] Patent Number: 5,539,913
[45] Date of Patent: Jul. 23, 1996

[54] SYSTEM FOR JUDGING WHETHER A MAIN PROCESSOR AFTER PROCESSING AN INTERRUPT IS REQUIRED TO PROCESS THE I/O CONTROL OF AN I/O CONTROL LOCAL PROCESSOR

[75] Inventors: Hirotake Furuta, Tokyo; Kouji Yamaguchi, Fukuoka, both of Japan

[73] Assignee: NEC Corporation, Japan

[21] Appl. No.: 973,027

[22] Filed: Nov. 6, 1992

[30] Foreign Application Priority Data

Nov. 8, 1991 [JP] Japan .................... 3-293380

[51] Int. Cl.⁶ .................. G06F 13/12; G06F 13/00
[52] U.S. Cl. .............. 395/825; 395/733; 364/228.5; 364/230.2; 364/238.3; 364/242.1
[58] Field of Search .............. 395/275; 364/200

[56] References Cited

U.S. PATENT DOCUMENTS

| | | |
|---|---|---|
| 3,377,623 | 4/1968 | Reut et al. ............... 340/172.5 |
| 3,534,338 | 10/1970 | Christensen et al. ............... 340/172.5 |
| 4,246,637 | 1/1981 | Brown et al. ............... 395/275 |
| 4,296,466 | 10/1981 | Guyer et al. ............... 395/275 |
| 4,371,932 | 2/1983 | Dinwiddie, Jr. et al. ............... 395/275 |
| 4,847,752 | 7/1989 | Akashi ............... 364/200 |
| 4,924,434 | 5/1990 | Christenson et al. ............... 364/900 |
| 5,131,081 | 7/1992 | MacKenna et al. ............... 395/275 |

*Primary Examiner*—Thomas C. Lee
*Assistant Examiner*—Marc K. Weinstein
*Attorney, Agent, or Firm*—Whitham, Curtis, Whitham & McGinn

[57] ABSTRACT

An information processing system according to the present invention judges whether or not an interruption accepted at a local processor for input/output control is to be terminated with the processing at the local processor only and if, the interruption is not to be terminated with such processing at the local processor only, notifies the main processor CPU of an interruption. Upon receipt of such interruption notice, the main processor CPU accesses the data area to store the input/output control information in local processor to prepare input/output control information. Then, the CPU of the main processor requests the input/output control section of the local processor to perform processing.

5 Claims, 2 Drawing Sheets

SYSTEM FOR JUDGING WHETHER A MAIN PROCESSOR AFTER PROCESSING AN INTERRUPT IS REQUIRED TO PROCESS THE I/O CONTROL OF AN I/O CONTROL LOCAL PROCESSOR

BACKGROUND OF THE INVENTION

1. Field of the Invention

The present invention relates to an information processing system provided with a main processor and an input/output control local processor for input/output control, and particularly relates to a processing method for input/output control.

2. Description of the Prior Art

A conventional information processing system of this type has an input/output control local processor for input/output control of telecommunication lines and a host main processor. The main processor is provided with a main CPU, a main data area and a main processing program which operates the main CPU; and the input/output control local processor is provided with a local CPU, a local data area, and a local processing program which operates the local CPU.

In an information processing system with such a configuration, input/output control has been performed by the input/output control local processor alone. Thus, when a request for input/output control occurs at the main CPU (when a request for data transmission is sent from a higher order communication procedure of communication control, for example), the main CPU interfaces with the input/output control local processor to issue the request to the input/output control local processor and have the requested input/output control executed at the input/output control local processor.

Thus, in conventional input/output control processing, any request for input/output control at the main CPU requires interface with the input/output control local processor, because the main CPU does not have the information for that input/output control. This means that provision of an input/output control local processor does not necessarily contribute to improvement of performance.

SUMMARY OF THE INVENTION

It is an object of the present invention to provide an input/output control processing method for an information processing system which is free from the above drawback and enables input/output control not only from the input/output control local processor but also from the CPU in the main processor.

According to a preferred embodiment of the present invention to attain the above object, an information processing system comprises an input/output control section which controls input and output via an input/output channel, a local CPU, an input/output control local processor provided with a data area to store input/output control information, and a main processor which controls a higher order system for said input/output control local processor, and said main processor further comprises a direct input/output control means for said input/output control section.

According to a further preferred embodiment of the present invention, said main CPU of the information processing system comprises a means of direct access to said local data area. Still preferably, an information processing system further comprises an input/output control channel between said local processor and the main processor for direct input/output control from said main processor to said input/output control section. Further, the input/output control local processor in the information processing system comprises a means to issue an interruption to said main CPU.

According to a preferred embodiment of the present invention to attain the above object, an input/output control processing method for an information processing system comprises a judgment step to determine whether to terminate the processing of interruption accepted by the local processor for input/output control is to be terminated with the processing at said local processor only, a notification step to notify the CPU in the main processor of an interruption when it is decided that said interruption processing is not terminated after the processing at said local processor only, a step to process said interruption at said main processor, a step where the CPU of said main processor accesses the data area storing the input/output control information of said local processor and prepares input/output control information, and a step where the CPU of said main processor requests the input/output control section in said local processor to perform processing.

According to a further preferred embodiment, an input/output control processing method of an information processing system further comprises a step to judge whether or not input/output control needs to be processed after interruption processing of said main processor and a step to terminate the processing when such input/output control processing is not required and to prepare said input/output control information when it is required.

Other objects, characteristics and effects of the present invention will be further clarified in the detailed description below.

DESCRIPTION OF THE PREFERRED EMBODIMENT

Figure 1:
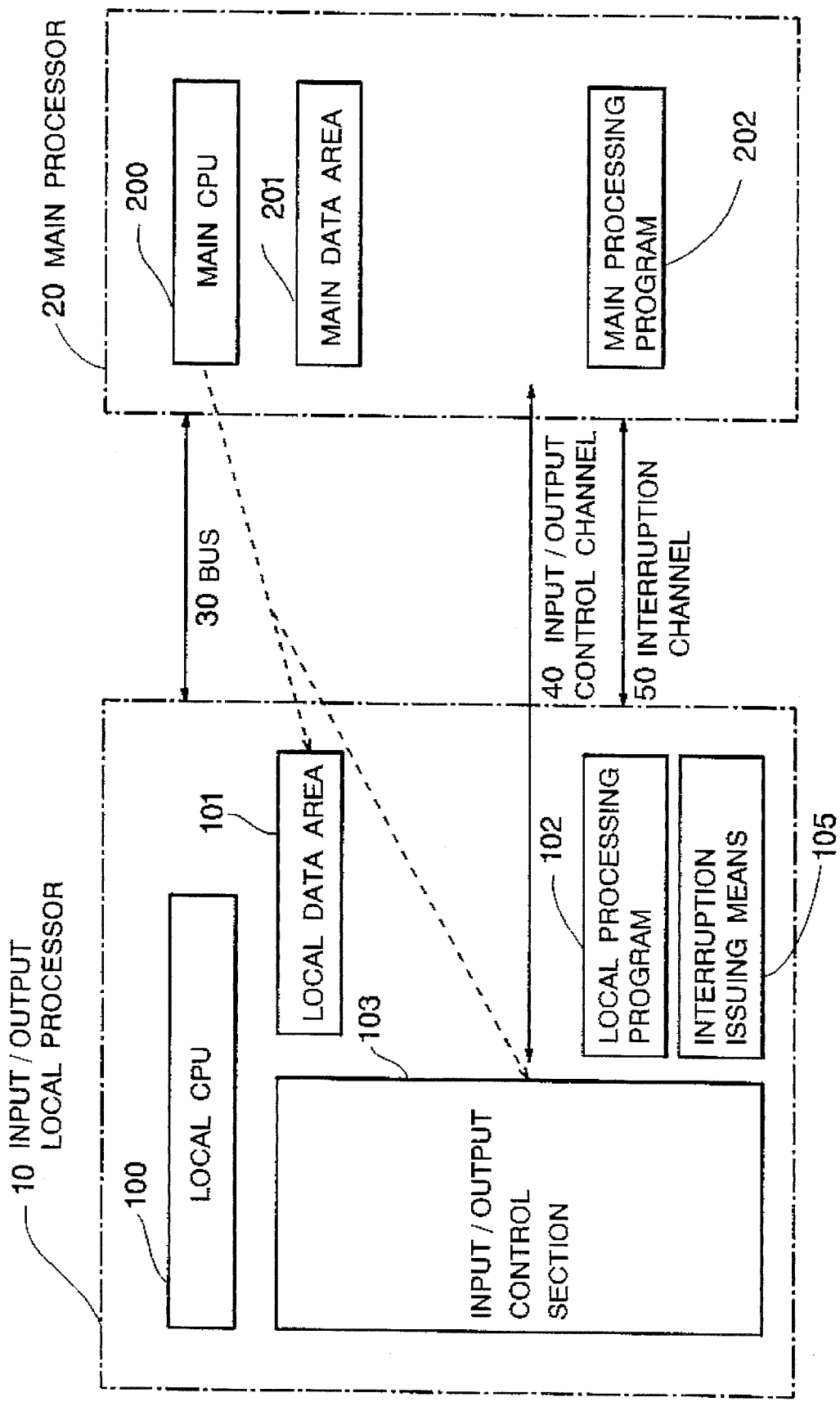
FIG. 1 is a block diagram to show the configuration of an information processing system according to an embodiment of the present invention.

Referring to the attached figures, preferred embodiments of the information processing device according to the present invention will be described. FIG. 1 is a block diagram to show the configuration of an information processing system according to an embodiment of the present invention.

An information processing system to which the input/output control processing method of the present invention is applied comprises an input/output control local processor 10 and a main processor 20 to control host units for the input/output control local processor 10. This embodiment is illustrated supposing a case where the above information processing system controls input/output of telecommunication lines.

The input/output control local processor 10 comprises a local CPU 100 for input/output control processing, a local data area 101 to store input/output control information concerning the control of telecommunication lines, a local processing program 102 which operates the local CPU 100, an input/output control section 103 and an interruption issuing means 105.

The local data area 101 stores control information for all input/output control procedures. The input/output control section 103 controls the telecommunications lines via an input/output channel (not shown). The interruption issuing means 105 is an innovative element of the present invention to notify the main CPU 200 of an interruption.

The main processor 20 comprises a main CPU 200, a main data area 201 and a main processing program 202 which operates the main CPU 200. The input/output control local processor 10 and the main processor 20 are mutually connected by a bus 30, an input/output control channel 40 and an interruption channel 50. The main data area 201 is in the main storage (not shown) of the main processor 20. The main CPU 200 in the main processor 20 can access the local data area 101 in the local processor 10 by means of the bus 30. Issuance of an interruption by the interruption issuing means 105 in the local processor 10 is notified to the main CPU 200 in the main processor 20 via the interruption channel 50.

The main CPU 200 is capable of direct input/output control for the input/output control section 100 via the input/output control channel 40. The main CPU 200 is also capable of direct access to the local data area 101 via the bus 30. The input/output control local processor 10 can notify the main CPU 200 of an interruption via the interruption channel 50. Thus, the input/output control local processor 10 and the main processor 20 are both capable of activating the other. In addition, the local data area 101 stores all input/output control information.

Figure 2:
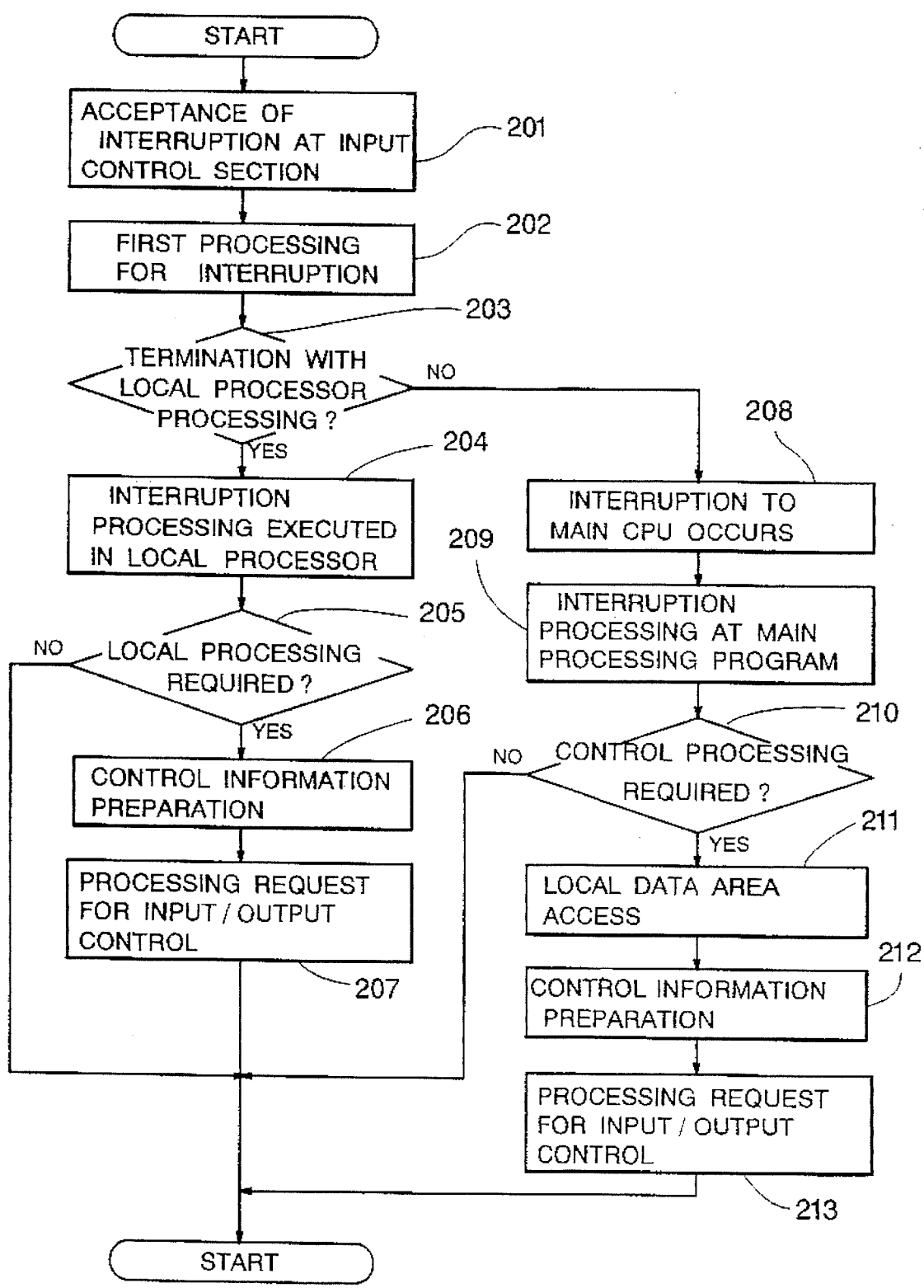
FIG. 2 is a flowchart to illustrate the input/output control processing method in the information processing system shown in FIG. 1.

Referring to FIGS. 1 and 2, a local processing method according to the present invention are described now. FIG. 2 is a flowchart to illustrate the procedure of the local processing method for this information processing system.

When an interruption occurs at the input/output control section 103, the input/output control local processor 10 once accepts the interruption at the local CPU 100 (Step 201). Such an interruption occurs when, for example, data is received during telecommunication line control performed at the input/output control section 103.

Then, the first processing for that interruption is conducted at the local processing program 102 (Step 202). The input/output control local processor 10 and the main processor 20 together constitute a hierarchical communication procedure control and usually control lower order communications with using the communication procedure at the input/output control local processor 10. The above first processing means controls of lower order communications. After the first processing, it is decided whether to terminate with processing in the input/output control local processor 10 (Step 203).

If it is decided to terminate, the interruption processing is executed in the input/output control local processor 10 (Step 204). After completion of interruption processing, it is judged whether input/output control is required to be processed or not (Step 205) and if not, the processing is terminated. When the input/output control requires to be processed, the local CPU 100 accesses the local data area 101 and thereby prepares control information for the input/output control section 103 (Step 206), and then requests the input/output control section 103 to perform processing (Step 207).

On the contrary, if it is judged that the local processing program 102 requires processing at the main CPU 200 in the main processor 20 in Step 203 (i.e. if the input/output control local processor 10 judges that higher order communication procedure control is required instead of lower order communication control), the input/output control local processor 10 generates an interruption sent to the main CPU 200 by means of the interruption channel 50 and the interruption issuing means 105 (Step 208). It may be judged that control by a higher order communication procedure is required when a request for data transmission or other request occurs at a higher order procedure in the communication control.

Upon acceptance of interruption at the main CPU 200, the main processing program 202 executes that interruption (209). After interruption processing at the main processing unit 202, it is judged whether the input/output control processing is required or not (Step 210). If not, the processing is terminated. When input/output control processing is required, the main CPU 200 accesses the local data area 101 via the bus 30 (Step 211) and at the same time prepares control information for the input/output control section 103 (Step 212). Via the input/output control channel 40, a processing request is directly issued to the input/output control section 103 (213).

In the figure, the broken lines show the processing where the main CPU 200, after acceptance of an interruption, accesses the local data area 101 in the input/output control local processor 10 and the processing where a processing request is issued to the input/output control section 103.

The input/output control local processor 10 which accepts the above processing request executes the input/output control from the main processing program 202 in the way similar to that of ordinary control from the local processing program 102. Thus, the main CPU 200 can directly control input/output for the input/output control local processor 10 without using the local processing program 102 in the input/output control local processor 10.

The present invention facilitates such controls not only with a single input/output control section 103 in the input/output control local processor 10, but also with a plurality of input/output control sections.

The present invention enables direct input/output control from the main CPU 200 and thereby improves the processing efficiency with shorter time for interface than in the processing using the input/output control local processor 10.

Obviously, various modifications can be made to the above embodiments. It is intended to cover in the appended claims all such modifications as fall within the true spirit and scope of the present invention.

What is claimed is:

1. An information processing system including:
 a main processor and an input/output control local processor, said input/output control local processor comprising:
   an input output control section for executing input and output control;
   a local central processing unit (CPU);
   a data area for storing input/output control information for the input/output control section;
   wherein said main processor executes a higher order control than said input/output control local processor, said main processor including:
     control means for directly executing the input/output control to said input/output control section of said input/output control local processor bypassing said local CPU,
   wherein said input/output control local processor, when the input/output control by said main processor is required, notifies said main processor of an interruption, said control means of said main processor controls the input/output control according to the interruption, said control means further for judging whether the input/output control needs to be processed after the interruption processing of said main processor, and said control means further for terminating the processing of said main processor when the input/output control is not required and preparing said input/output control information by said main processor when the input/output control is required.

2. An information processing system as set forth in claim 1, wherein said main processor comprises means for directly accessing said data area and for generating the input/output control information.

3. An information processing system as set forth in claim 1, further comprising an input/output control channel connected between said input/output control local processor and said main processor for allowing direct control of said input/output control section from said main processor.

4. An information processing system as set forth in claim 1, further comprising an interruption control channel for notifying said control means of said main processor of the interruption from said input/output control local processor between said local processor and said main processor, said input/output control local processor comprising means for issuing the interruption for input/output control to said main processor.

5. An input/output control processing method for an information processing system including a main processor and an input/output control local processor having a data area, said method comprising the steps of:

a judgment step for determining whether the processing of interruption accepted by the local processor for input/output control is to be terminated with the processing at said local processor only, a step for processing said interruption at the local processor when it is determined that said interruption processing is terminated, a notification step for notifying a central processing unit (CPU) in the main processor of an interruption when it is determined that said interruption processing is not terminated with the processing at said local processor only, a step for processing said interruption at said main processor, a step for accessing the data area in which the input/output control information of said local processor s stored and preparing the input/output control information by the CPU in the main processor, a step for requesting the processing of the input/output control section in said local processor by the CPU of said main processor, a step for judging whether input/output control needs to be processed after interruption processing of said main processor, and a step for terminating the processing of said main processor when such input/output control processing is not required and preparing said input/output control information by said main processor when such input/output control processing is required.

* * * * *